United States Patent [19]

Hooshiari

[11] Patent Number: 5,570,410
[45] Date of Patent: Oct. 29, 1996

[54] DYNAMIC RESOURCE ALLOCATION PROCESS FOR A SERVICE CONTROL POINT IN AN ADVANCED INTELLIGENT NETWORK SYSTEM

[75] Inventor: Alireza Hooshiari, Atlanta, Ga.

[73] Assignee: Bellsouth Corporation, Atlanta, Ga.

[21] Appl. No.: 322,583

[22] Filed: Oct. 13, 1994

[51] Int. Cl.$^6$ .............. H04M 3/08; H04M 3/22; H04M 15/00; H04M 3/42
[52] U.S. Cl. .................. 379/32; 379/9; 379/10; 379/14; 379/34; 379/111; 379/112; 379/113; 379/114; 379/115; 379/207; 379/221
[58] Field of Search ................... 379/9, 10, 14, 379/32, 34, 111–115, 207, 221

[56] References Cited

U.S. PATENT DOCUMENTS

| | | | |
|---|---|---|---|
| 4,748,658 | 5/1988 | Gopal et al. | 379/221 |
| 4,782,519 | 11/1988 | Patel et al. | 379/221 |
| 4,924,386 | 5/1990 | Freedman et al. | 364/402 |
| 4,993,024 | 2/1991 | Quinquis et al. | 370/94.1 |
| 5,206,901 | 4/1993 | Harlow et al. | 379/211 |
| 5,212,227 | 5/1993 | Ramkumar | 379/113 |
| 5,212,727 | 5/1993 | Ramkumar | 379/221 |
| 5,231,631 | 7/1993 | Buhrke et al. | 370/60 |
| 5,247,569 | 9/1993 | Cave | 379/113 |
| 5,251,255 | 10/1993 | Epley | 379/242 |
| 5,282,244 | 1/1994 | Fuller et al. | 379/230 |
| 5,359,646 | 10/1994 | Johnson | 379/31 |
| 5,416,831 | 5/1995 | Chewning | 379/201 |
| 5,418,846 | 5/1995 | Morrisey | 379/112 |
| 5,422,941 | 6/1995 | Hasenauer | 379/207 |
| 5,425,090 | 6/1995 | Orriss | 379/112 |
| 5,430,719 | 7/1995 | Weisser | 379/95 |
| 5,436,957 | 7/1995 | McConnell . | |

Primary Examiner—Wellington Chin
Assistant Examiner—Vijay Shankar
Attorney, Agent, or Firm—Jones & Askew

[57] ABSTRACT

A method of resource allocation for a service control point (SCP) in an advanced intelligent network. The method dynamically assigns resource time to various entities using the SCP, based upon the resource time needs of each entity as compared to the resource time needs of each other entity and the total processing capacity of the SCP. Initially, a SCP resource time is assigned to each entity to be monitored. The resource time of the monitored entities is monitored over a chosen observation interval. After the completion of the observation interval, any unutilized resource time from any of the monitored entities is assigned to other monitored entities which have used more than their assigned resource time during the previous observation interval. It is also determined whether a SCP is operating at full capacity during a given observation interval. If so, the process limits the use of resource time with the SCP of any monitored entities using resource time in an observation interval greater than that initially assigned to it.

15 Claims, 5 Drawing Sheets

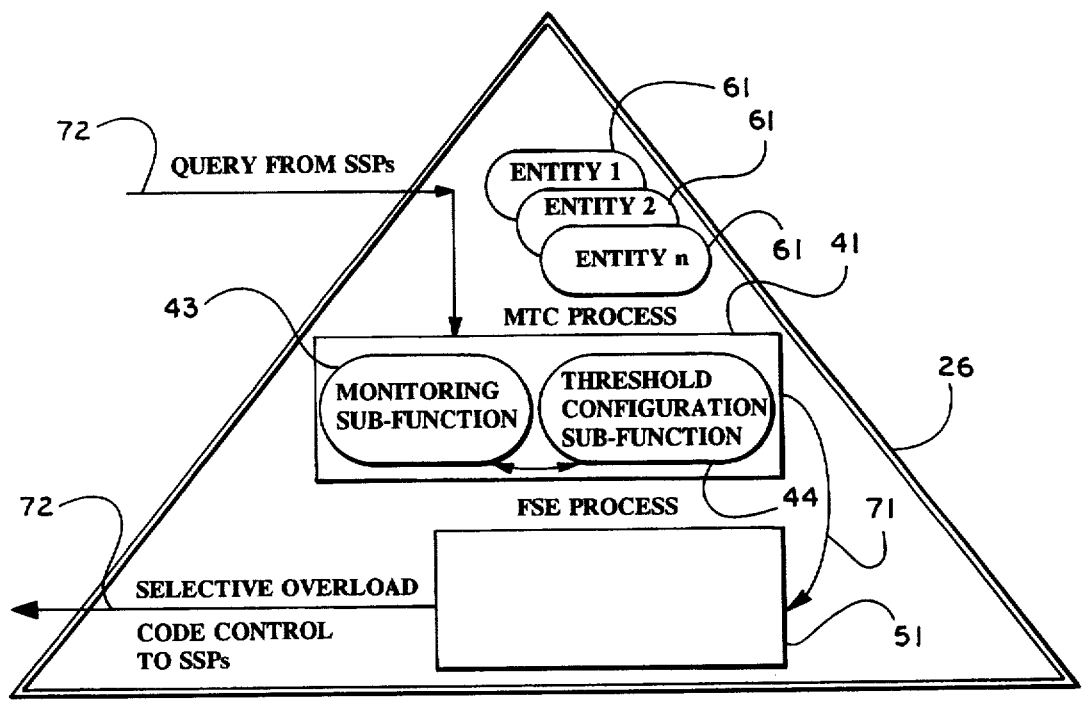
Fig_2
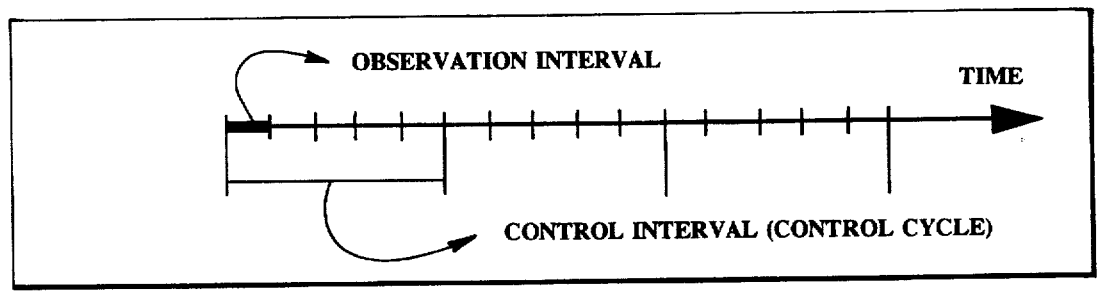
Fig_4

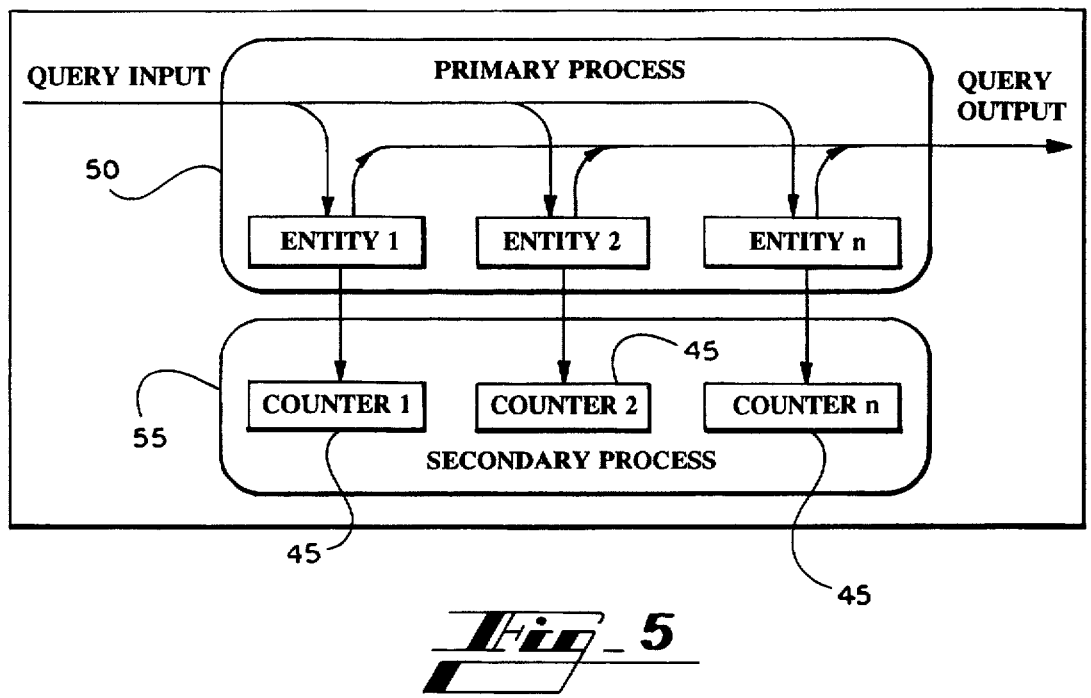
Fig_5
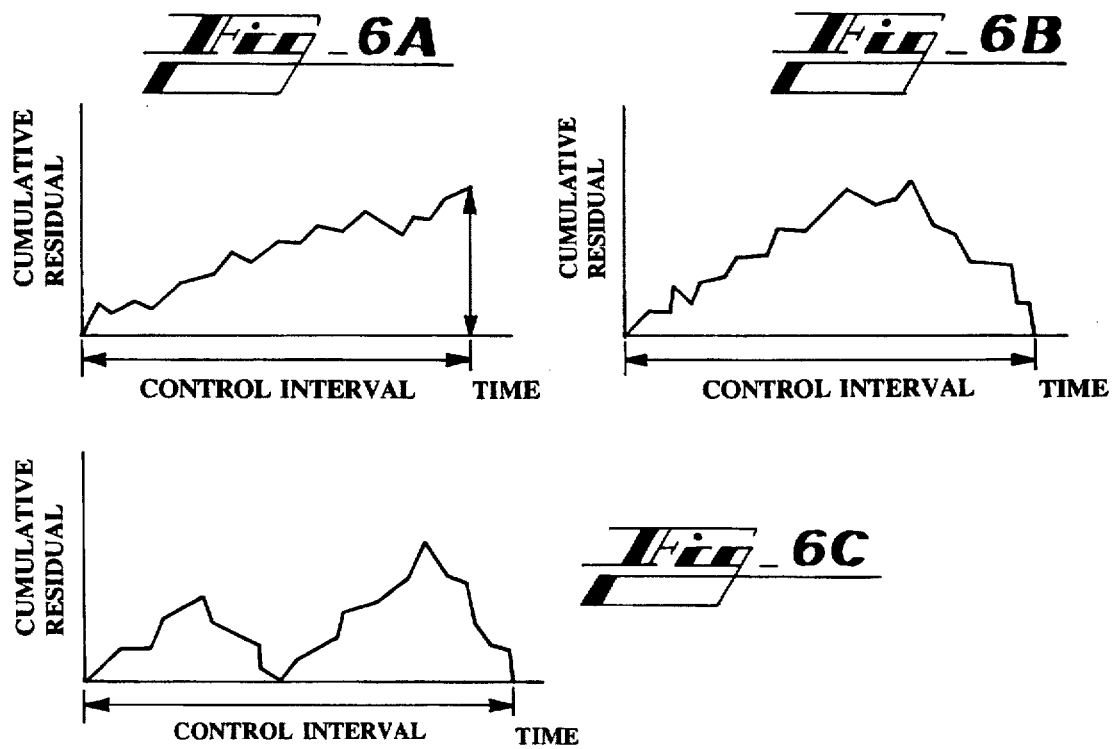
Fig_6A
Fig_6B
Fig_6C

DYNAMIC RESOURCE ALLOCATION PROCESS FOR A SERVICE CONTROL POINT IN AN ADVANCED INTELLIGENT NETWORK SYSTEM

TECHNICAL FIELD

The present invention relates to the field of switched telephony, and in particular, is a method of allocating processing time in a service control point of an advanced intelligent network among a variety of entities to obtain more efficient and economical use of the service control point processing time.

BACKGROUND OF THE INVENTION

Many special telephone services have been made available to subscribers in recent years. Most of these services, such as call waiting and caller identification, are designed to operate within the telephone network as originally designed by American Telephone and Telegraph Company (AT&T) and further developed by the Regional Bell Operating Companies (RBOCs) and other telephone service providers. The specific networks currently used by the RBOCs are, in relevant part, identical throughout the United States and most of the developed industrialized world including Western Europe and Japan.

The fundamental architecture of Public Switched Telephone Networks (PSTNs) in the industrialized western world is that separate signaling paths are provided for the voice (or other customer-utilized communication circuits) and for information transmitted throughout the network that controls the connection and disconnection of the voice circuits. This is to be contrasted with earlier versions of Public Switched Telephone Networks in which tone signals were transmitted over the same circuits used as voice paths, to control set-up and takedown of calls, creation of billing records, and the like.

The current implementation of the control network used in the United States is referred to as the Signaling System 7 (SS7) network. The Advanced Intelligent Network (AIN) is a standard call control protocol which uses the SS7 network for message transport. The AIN enables telecommunications call control and database access from any computer or switching system connected to the SS7 network.

The service control point (SCP) platform is one piece of the AIN and is designed to support growth of service query processing by using an architecture that can accommodate multiple entities in a single SCP. The SCP contains various common resources that are basically those components used in processing of a query, for example, SS7 message handlers, real-time memory, processor real-time, and database management system. These resources are characterized in terms of the SCP real-time query processing capacity. SCP capacity is referred to as the query processing capacity and is expressed in queries per second or transactions per second. Therefore, the term "SCP capacity" means the SCP query processing capacity and is related to the processor real-time. As can be appreciated by one skilled in the art, in view of the complexity of managing the AIN, it is important that SCP common resources be allocated among different entities which utilize these resources using a resource allocation process.

As discussed above, the SCP resources are typically shared among several AIN services supported on a single SCP platform. If unregulated, it is possible that a single service could utilize the majority of the SCP resources causing not only an SCP general overload and congestion but also causing service degradation in other services supported on the same SCP platform. In another example, there are many large customers who are expected to use a considerable portion of an SCP's capacity; however, each large customer could be using, at any given time, more than its fair share of SCP capacity, causing overloading of the SCP and service degradations for other customers.

On the other hand, various entities in the SCP may have peak SCP usage intervals at different times. Therefore, the SCP may have available capacity that could be used by an entity during that particular entity's peak interval. A static threshold, therefore, may not be appropriate to manage the flow of queries to various entities in the SCP and may result in underutilization of an SCP.

The present invention works within the AIN to use the resources of the AIN and its components more efficiently and is not previously disclosed in the art. Specifically, the present invention allows the SCPs within the AIN to operate more efficiently. Therefore, it is advantageous to briefly describe the AIN and its architecture in order to have a complete understanding of the objects and advantages of the present invention. The general architecture of the AIN is relatively simple and is shown in FIG. 1.

FIG. 1 of the specification is a block diagram representing at least part of the AIN of a typical local exchange carrier. While the diagram is simple, the components therein are well known to those skilled in the art. The majority of intelligence in the intelligent switched network resides in computers and switches that embody the AIN, and make use of the SS7 message transport network. SS7 is a network architecture in which information about a telephone call is transmitted over high speed data links that are separate from the voice circuits used to complete the call itself. Using SS7, it is determined whether it is possible to complete a call prior to assigning trunk capacity to set up the voice link. A plurality of central office switches are provided in a typical portion of the public switch telephone network. These are indicated as service switching point (SSP) switches 15–15' in FIG. 1. The dash line between these indicates that the number is arbitrary. Non-SSP switches, such as switch 16, are also included within the network.

The difference between an SSP central office switch and a non-SSP central office switch is that the former includes intelligent network functionality. This is an indication that the switch is equipped with appropriate hardware and software so that, when a set of predetermined conditions is detected, the switch will initiate a trigger for a predetermined state of a call on a subscriber line, generate the trigger as an appropriate message to be sent over the AIN, and suspend handling of a call until it receives a reply from the network instructing it to take certain action. In the alternative, the switch will have a default task to execute if a time-out occurs and no response is provided by the network to the query made by the switch. In summary, the SSP switches are those that are fully equipped to deal with and to take advantage of the AIN described herein.

Non-SSP switch 16 is an electronic switch that can generate certain rudimentary packets and provide them over the network, but which must rely on other equipment to provide subscriber lines connected to such a switch with more complex features and services available in the intelligent network. Central offices 15–15' and 16 each have a plurality of subscriber lines commonly designated as 17–17', connected thereto. Typically, the number of subscriber lines will be on the order of 10,000 to 70,000 lines. Each subscriber line 17–17' is connected to a terminating piece of customer's premise equipment that is represented by a like plurality of telephone sets 18–18' for each of the switches.

Interconnecting central office switches 15 and 16 are a plurality of trunk circuits indicated as 19 in FIG. 1. These are the voice path trunks that interconnect the central office and over which calls are connected when established. It should be understood that central office trunking in a typical urban environment is not limited to a daisy chain arrangement implied by FIG. 1. In other words, in a typical network, trunk circuits will exist between central office switch 15' and central office switch 16. Therefore, when a local call is made between two central offices, if a direct trunk connection exists between the offices, and is not busy, the network will assign that trunk to the completion of that particular call. If there is no direct trunking between the two central offices or the direct trunks are all in use, the last call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter-exchange carrier switches that switch nothing but long distance trunk circuits are included.

Most of the intelligence of the intelligent switched telephone network resides in the remaining components shown on FIG. 1. These are the computers and switches that embody the current version of the common channel interoffice signaling scheme (SS7) mentioned above. Each of switches 15 through 16 is connected to a local signal transfer point (STP) 20 via respective data links 21a, 21b, and 21c. Currently, these data links are 56 kilobit per second bi-directional data links employing a signal protocol referred to as Signaling System 7 (SS7). The SS7 is well known to those skilled in the art and is described in a specification promulgated by the American National Standards Institute (ANSI). The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data field and a routing label. A service information octet is provided that identifies a priority of the message, the national network of the destination of the message, and the user name identifying the entity that created the message. Also, certain control and sequence numbers are included within the packet, the uses and designations of which are known to those skilled in the art and described in the above-referenced ANSI specification.

All of the SS7 data packets from the switches go to a signal transfer point (STP) 20. Those skilled in the art will recognize that signal transfer point 20 is simply a multi-port, high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 20 are conventionally installed in redundant pairs within a network so that if one device fails, its mate takes over until the first STP is able to return to service. In practice, there are redundant data links between each of central office switches 15–16 for enhanced reliability. For the sake of simplicity of the drawings, the redundant devices have not been illustrated in the drawing figures and the specifications.

Also connected to signal transfer point 20 over SS7 data link 25 is a 1AESS network access point (NAP) 22. Network access point 22 is a computing device programmed to detect trigger conditions. It requires the support of an SSP switch to notify AIN network systems of these trigger detection events. An SSP can support multiple NAP switches. Logically, this SSP is designated as the destination address for many of the packets generated by the network that would otherwise be routed to the 1AESS NAP if it were an SSP equipped switch.

Much of the intelligence, and the basis for many of the new enhanced features of the network reside in the local service control point (SCP) 26 that is connected to signal transfer point 20 via SS7 data link 27. As is known to those skilled in the art, service control points are physically implemented by relatively powerful fault tolerant computers. Typical implementation devices include the Star Service FT Model 3200 or the Star Service FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate 1 to 27 disk drives ranging from 300 megabytes to 1.2 gigabytes per drive, and have main memory on the order of 24 to 192 megabytes. Thus, it will be appreciated that these are large and powerful computing machines. Among the functions performed by the service control points is maintenance of network data bases used in providing enhanced services. The computer embodying the SCPs can execute at a speed on the order of 17,000,000 instructions per second. Using the SS7 protocol, this translates to about 50–100 transactions (query/response pairs) of network messages per second.

Service control point computers were initially introduced into the network to handle the necessary translations and billing transactions for the implementation of 800 phone service. An 800 number subscriber has at least one dial-up number that is to be called when a call to that subscriber's 800 number is placed. There is no physical central office or area of the country that corresponds to the 800 area code. It is significantly more economical to provide a few central locations at which the look up of the directory number for an 800 number call can be made than to provide the translation information redundantly at many central office switches. Currently, service control points also include data bases for credit card call transactions.

Also, service control points include data bases that identify particular service customers. In order to keep the processing of data and calls as simple and generic as possible at switches, such as switches 15–15', a relatively small set of triggers are defined at the switches for each call. A trigger in the network is an event associated with a particular subscriber line or call that generates a packet to be sent to a service control point. The trigger causes the service control point to query its data base to determine whether some customized calling feature or enhanced service should be implemented for this particular call, or whether conventional plain dialed-up telephone service (POTS) should be provided for the call. The results of the data base inquiry are sent back to the switch from SCP 26 through STP 20. The return message includes instructions to the switch as to how to process the call. The instruction may be to take some special action as a result of a customized calling service or enhanced feature. If no return message is received at the switch from SCP 26 through STP 20, the call is treated as a POTS-type call. In response to receiving the later type message, the switch will move through its call states, select the call digits, and may generate further messages that will be used to set up and route the call, as described herein above.

Similar devices for routing calls among various local exchange carriers are provided by regional signal transfer point 28 and regional service control point 29. The regional STP 28 is connected to local STP 20 via an SS7 data link 30. The regional STP 28 is connected to the regional SCP 29 via data link 31 that is physically and functionally the same as data link 27 between the corresponding local devices. As is the case with local devices, regional STPs and SCPs are provided in mated redundant pairs for purposes of reliability.

Both local and regional service control points 26 and 29 are connected via respective data links 35 and 36 to a service management system (SMS) 37. The service management system is also implemented by a large general purpose digital computer and interfaces to business offices in the local exchange carrier and inter-exchange carriers. The service management system downloads information to the data bases of the service control points 26 and 29 when subscribers modify their ensemble of AIN services. Similarly, the service management system downloads, on a non-real time basis, billing information that is needed in order to appropriately invoice telephone company subscribers for the services provided.

The AIN will also include (in the AIN 0.2 software release) service nodes (SNs) such as service node 39 shown in FIG. 1. The AIN 0.2 software release, which incorporates service nodes into the AIN, is known in the art and described in Bell Communications Research GR-1280-CORE "Advanced Intelligent Network (AIN) Service Control Point (SCP) Generic Requirements," Issue 1, August 1993; and Bell Communications Research GR-1298-CORE, "Advanced Intelligent Network (AIN) 0.2 Switching Systems Generic Requirements," Issue 1, November 1993. Those skilled in the art will be familiar with service nodes, which are physically implemented by the same types of computers that embody the service control points 26 and 29. In addition to the computing capability and data base maintenance features, service node 39 also includes voice and DTMF signal recognition devices and voice synthesis devices. Service node 39 is connected to the service management system 37 via a data link 40 that services the service node in essentially the same way it services SCPs 26 and 29. While service node 39 is physically quite similar to SCP 26, their functions are different. Service control points such as SCP 26 normally implement high volume routing services such as call forwarding and 800 number translation and routing. They are also used for maintenance of and providing access to high volume data bases for authorization of billing, such as credit card number validations. In most local exchange carrier networks, service control points are only used for data base lookup and routing services that take place prior to the connection of the call.

By contrast, service nodes, such as service node 39, are used principally when some enhanced feature or service is needed that requires an audio connection to the call or transfer of a significant amount of data to a subscriber over a switch connection during or following a call. As shown in FIG. 1, service node 39 is typically connected to one or more switches via Integrated Service Digital Network (ISDN) links shown as 41. Thus, services that require real-time communication with a customer during a call usually employ the facility of a service node such as service node 39.

As discussed above, SCPs contain much of the intelligence of the AIN network. SCPs typically include SS7 message handlers, real-time memory, processor real-time and a Database Management System, among other things. Therefore, it can be appreciated that SCPs provide support for a number of different entities, each of which may use a portion of the SCP real-time query processing capacity. One type of entity supported by an SCP 26 is called a Service Package Application (SPA). SPAs share a pool of SCP common resources known as the SCP platform. Within each SPA there are other entities, such as large subscribers, that may also use a substantial portion of the SCP 26 capacity. These competing SPAs and other entities can experience simultaneous peaks resulting in overload of the items listed above, thus decreasing the quality of AIN service. Because competing entities may peak at different times, it would not be efficient to use a static threshold to manage the flow of queries from SPAs and other entities to various SCP resources. A static threshold may also cause an underutilization of the SCP capacity. For instance, using a static threshold places an inflexible cap on the number of queries to any certain entity regardless of whether the SCP has space capacity due to another entity under utilizing its processing time. Therefore, it is possible that queries to a given entity in an SCP could be processed at a slower rate despite the fact that the SCP may not be operating at full capacity.

The foregoing description is a basic overview, together with a few examples, of the operation of the advanced intelligent network that is a modern public switch telephone system. In summary, the advanced intelligent network is a complex high speed, high traffic volume packet switched messaging arrangement that provides a great deal of versatility in handling of telephone calls.

SUMMARY OF THE INVENTION

The present invention is a method of allocating resource time in an SCP located in an AIN. Stated in its broadest terms, the present process monitors various entities which use SCP real-time processing capacity or processing time, and dynamically allocates SCP processing time to the monitored entities based on data from the monitoring. SCP processing time can also be stated in the number of queries which can be processed by an SCP or other entity over a given time interval, such as "queries per second." More particularly, the process initially assigns SCP resource time to each entity to be monitored, and the resource time of the monitored entities is monitored over a chosen observation interval. After the completion of the observation interval, any unutilized resource time from any of the monitored entities is assigned to other monitored entities which have used more than their assigned resource time during the previous observation interval.

The process of the present invention may also include monitoring the total resource time of the SCP during an observation interval, and determining whether the SCP is operating at full capacity during that observation interval. If the SCP is operating at full capacity during the observation interval, the process limits the use of resource time within the SCP of any monitored entities using resource time in the observation interval greater than that initially assigned to it.

The monitoring of the entities is preferably performed by the use of counters which are updated on a periodic basis.

More particularly described, the present invention allocates limited resource time to process various queries in an SCP located in an advanced intelligent network for various monitored entities. The SCP has various entities residing on it. An entity can be either a service or a subscriber. The process includes assigning SCP resource time for processing queries to each of the entities to be monitored, and monitoring the SCP for queries. When a query is initiated, it is determined which monitored entity is receiving a query for processing. A counter associated with that monitored entity receiving the query for processing is incremented. An interval of time called an observation interval is also established. The counters are decremented after each observation interval by an amount less than or equal to the initially-assigned resource time. The counters are decremented by the amount of resource time used during the observation period if that value does not exceed the initially-assigned resource time and they are decremented by the initially-assigned resource time if the amount of resource time used by an entity during an observation period is greater than its initially-assigned resource time. Thereafter, it is determined which of the counters, if any, for the monitored entities have zero values at the end of an observation interval. It is also determined which of the counters for the monitored entities, if any, have positive values at the end of any observation interval. Based upon those determinations, unutilized resource time is reassigned from the monitored entities with the zero value counters to the monitored entities with the positive value counters at the end of the prior observation interval. The process of the present invention also preferably includes a mechanism to regulate the flow of queries to monitored entities with positive counter values for a control interval, which is typically longer than an observation interval, immediately after the control interval when the counter has a positive value.

Therefore, it is an object of the present invention to provide a process for providing efficient and effective use of an SCP in an AIN.

It is also an object of the present invention to provide a method which is flexible in allocating SCP resource time for various entities using the SCP for processing requirements.

That the present invention meets these objects will be appreciated from the foregoing description of various embodiments of the present invention.

BRIEF DESCRIPTION OF THE DRAWINGS

FIG. 2 is a diagrammatical overview of the process of the present invention.

FIG. 4 is a diagram that illustrates a comparison between the observation interval and the control interval in the preferred embodiment.

FIG. 5 is a diagrammatic overview of the process for the monitoring mechanism in the preferred embodiment of the present invention.

FIGS. 6A–C illustrate various counter values over a given control interval in the preferred embodiment.

DETAILED DESCRIPTION OF PREFERRED EMBODIMENTS

Figure 1:
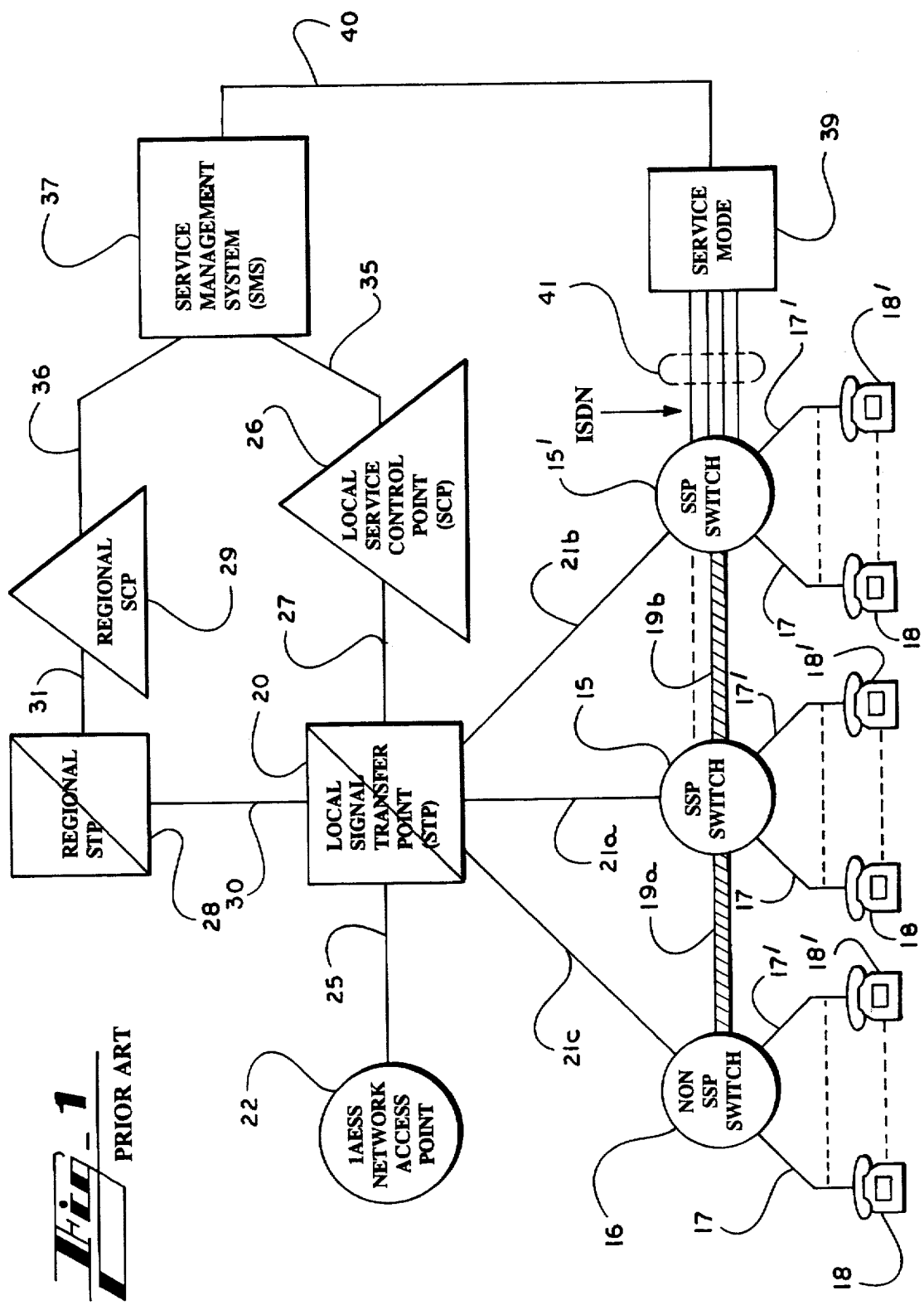
FIG. 1 is a diagram of a prior art existing switched telephone network including the advanced intelligent network that controls same.

Turning now to the drawing figures in which like numerals reference like parts and steps, the preferred embodiment of the present invention will now be described.

The AIN SCP is expected to provide support to a number of different entities. In operation, whenever the SCP real-time query processing capacity is shared among various entities, a portion of this capacity must be allocated to each entity as the entity's initial fair share (FS) threshold. These allocations are generally based on the demand characteristics of each entity being monitored by the SCP and are preferably based upon the demand characteristics in connection with the total engineered SCP capacity. The FS threshold is generally the capacity assigned to each entity based upon past normal operating conditions and is monitored on a continuous basis. The FS capacity for each entity is characterized in terms of queries per time interval, usually some short time interval such as 100 ms. The selected entities within the SCP platform are monitored to insure that each utilizes its fair share of resources; however, an entity is not penalized for using more than its FS threshold so long as the SCP has available processing capacity due to the lack of demand from other monitored entities. If a monitored entity within the SCP violates or exceeds its FS threshold for a given time interval, the present invention will activate a Selective Overload Code Control (SOCC) to insure that services for other monitored entities are not being jeopardized at the expense of the entity exceeding its FS threshold. The SOCC will trigger a code gapping mechanism at the SSP to reduce the flow of traffic for the entity that is over utilizing the SCP.

The present invention is a process that monitors various entities which use SCP real-time processing capacity or processing time. The process of the present invention dynamically allocates SCP processing time to the monitored entities based upon data from the monitoring process. Each monitored entity, whether it is an entity assigned to a particular SPA or another SCP supported entity, uses a portion of the SCP real-time query processing capacity or processing time. The resources or services supplied by the SCP are basically those components used in processing a query, such as SS7 message handlers, real time memory, processor real-time and Database Management System, and are characterized in terms of the SCP real-time query processing capacity. As can be appreciated, there is a finite real-time query processing capability for any given SCP and, therefore, it is desirable to use the processing capability of each SCP as efficiently as possible. The process of the present invention helps to effectively and efficiently utilize the real-time processing capability for an SCP.

FIG. 2 is a diagrammatic overview of the process of the present invention. As shown in FIG. 2, the process of the present invention includes two sub-processes; namely, the monitoring and threshold configuration (MTC) 41 process, and the fair share enforcing (FSE) process 51. The MTC 41 process monitors the flow of traffic to each entity supported by the SCP 26 to determine if any monitored entity 61 is exceeding its FS threshold. This monitoring is conducted on a continuous basis. The FS threshold for each entity is adjusted periodically based upon the utilization of the SCP capacity by a given entity and by all entities in total. The interval between adjustments of each monitored entity's FS threshold is called an observation interval. The FS threshold for each monitored entity may be adjusted at the end of an observation interval based upon a variety of factors, including the number of queries 73 received for each monitored entity during the last observation interval, the capacity allocated to each monitored entity 61 in the SCP, and the total SCP query utilization level over the previous observation interval.

The MTC 41 process generates a control message, as shown by arrow 71 in FIG. 2, to the FSE process at the end of a control interval only if there is a need for reducing traffic rate for a monitored entity based on the status of query inquiries. The control message indicates that the FSE 51 must initiate an SOCC to selectively reduce the flow of queries to the effected entity. The control message will contain the appropriate control parameters such as control severity and duration. The FSE maps the control information for the effected monitored entity to appropriate SOCC parameters. These parameters are generally gap level and gap duration at SSPs. Mapping is completed by the control mapping function in the FSE. The SOCC message, as shown by arrow 72 in FIG. 2, is launched by the automatic control figure at the FSE informing SSPs to start a code gapping process to reduce queries targeted for the effected entity.

Figure 3A:
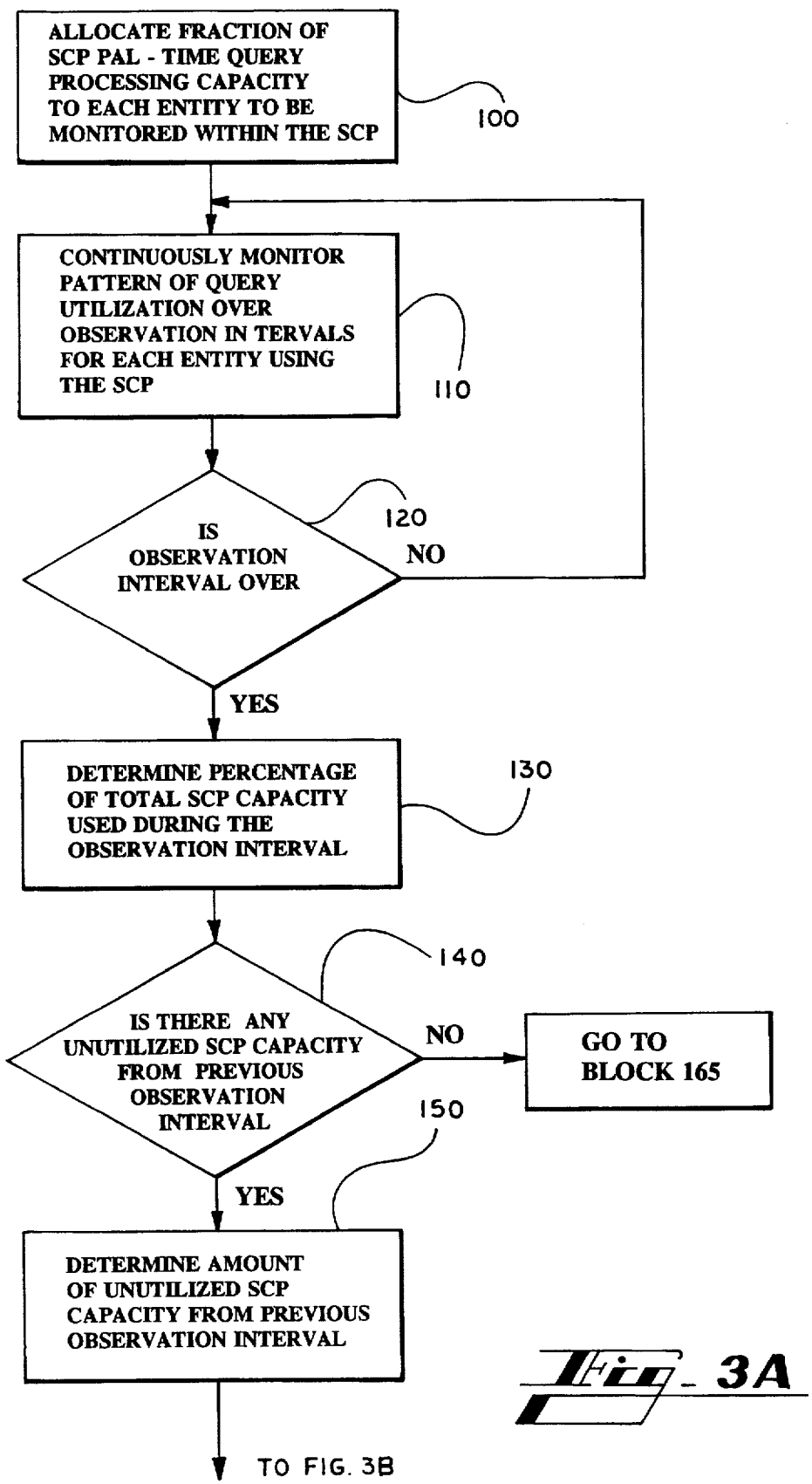
FIGS. 3A and 3B are interconnected parts of a flow chart that illustrates the process according to a preferred embodiment of the present invention, with respect to the operation of an SCP.
Figure 3B:
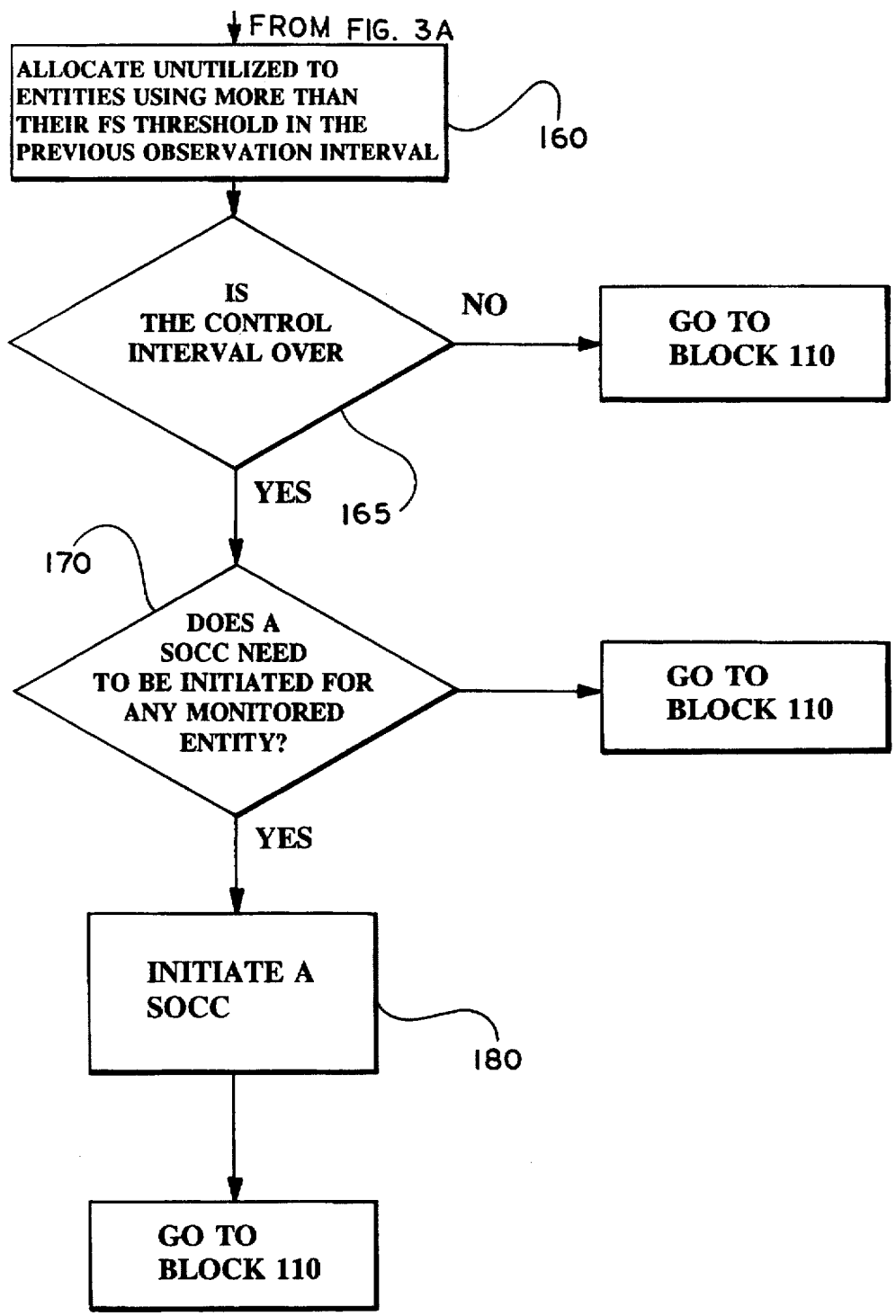

The process of the present invention is also set forth in FIG. 3. FIG. 3 shows a flow chart which generally describes the preferred embodiment in connection with the typical AIN network elements shown in FIG. 1, and particularly with respect to the operation of an SCP, which was discussed above in connection with the Background of the Invention. Initially, a portion of the SCP real-time query processing capacity is allocated to each monitored entity within the SCP (block 100, FIG. 3). This allocation is referred to as the monitored entity's fair share (FS) threshold under normal load. Typically, the FS threshold is initially set based upon previous traffic patterns for that entity as well as other entities which may be sharing SCP capacity with the entity. It is also important to consider whether any monitored entities for a given SCP have extremely peaked traffic in initially assigning FS threshold to each entity. In operation of the AIN, each entity that has been assigned a FS threshold, typically defined by queries per minute, is monitored continuously to determine the pattern of query utilization over short intervals of time for each entity using the SCP (block 110, FIG. 3). Various counters 45, as shown diagrammatically in FIG. 5, are used and updated on a periodic basis in order to conduct this monitoring. The counters 45 are updated on a periodic basis called an observation interval. The observation interval can be any assigned interval of time, but is preferably 100 ms.

At the end of each observation interval, it is determined what percentage of the total SCP capacity was used during that given observation interval (blocks 120, 130, FIG. 3). The capacity is measured in terms of the number of queries arriving for all monitored entities within the SCP during the observation interval, as compared to the cumulative FS thresholds which are established for each of those entities. Thereafter, the total amount of SCP unutilized capacity at the end of the observation interval is determined, if any (blocks 140, 150, FIG. 3). The amount of unutilized SCP capacity is then allocated to entities which have used more than their FS threshold in the previous observation interval (block 160, FIG. 3). This allocation is completed by increasing the FS threshold for those particular entities for the next observation interval. The increased FS threshold for a given entity will be decreased back to its normal level during the following observation interval if that entity does not use its FS threshold or if the SCP does not have enough unutilized capacity to support the entity's increased FS threshold. Finally, if needed, a Selective Overload Code Control (SOCC) is initiated periodically to control the flow of queries to those entities that have exceeded their FS threshold (blocks 170, 180, FIG. 3). A SOCC is initiated for each entity that has exceeded its FS threshold averaged over a control interval or when an entity has exceeded its FS threshold and the SCP is at its total engineered capacity. Alternatively, if an SCP is at its total engineered capacity, it may also begin a "blanket" regulation of all entities that it services, regardless of how much resource time each entity is using, in order to prevent an overload situation from occurring. A control interval is typically a much longer interval than an observation interval. FIG. 4 is a diagram which illustrates the operation of the observation interval as compared with the control interval over time. If a SOCC is needed, the SOCC parameters are determined at the end of the control interval based upon the status of a counter which monitors the query rate of each entity. The counter parameters will directly be mapped to SOCC parameters by the control mapping function in the fair share enforcing (FSE) process described below.

More particularly described, the process of the present invention can be divided into the two sub-processes briefly mentioned above, namely, the MTC process and the FSE process. The MTC 41 process consists of two mechanisms, the monitoring mechanism 43 and the threshold configuration mechanism 44, working jointly. A diagrammatic overview of the process for the monitoring mechanism is set forth in FIG. 5. The monitoring mechanism consists of two parallel interworking processes called the primary process 50 and the secondary process 55. Both the primary and secondary processes are triggered by the arrival of a query at the SCP 26. The primary process is the actual query flow process while the secondary process is a duplicate of the actual process. During the primary process 50, a query is received by the SCP and checked to determine to which monitored entity that query belongs. After this is determined, a message will be sent to that entity's corresponding counter 45 in the secondary process 515. The query will then proceed through the normal processing route with no significant delays imposed.

The secondary process consists of a set of counters 45 in parallel. For each monitored entity in the primary process, there is a corresponding counter in the secondary process as shown in FIG. 5. A counter 45 is incremented whenever a query is received for a corresponding entity and decremented at a fixed interval called the observation interval. The decrementation rate for each counter is set equal to the lesser of the interval of time actually used by the entity in the immediately previous observation interval or by the FS threshold value for the corresponding entity. The counter calculates the number of queries received for an entity over an observation interval, as well as the number of queries received for an entity beyond its FS threshold during a given observation interval. The process of the present invention provides for increasing, if necessary, the FS threshold of an entity after an observation interval in order to help accommodate a peak demand interval for a given entity 61. However, if an entity 61 has exceeded its FS threshold for a given control interval, the MTC 41 forwards a message to the FSE 51 to initiate a SOCC in order to reduce the flow of traffic to that entity. A control interval is typically much longer than an observation interval. A control interval is preferably approximately thirty seconds in length. The control interval monitoring is primarily designed to prevent an entity from exceeding its initial FS threshold for an extended interval of time.

Using the process of the present invention, the FS threshold for each entity is dynamic in operation of the AIN with a range between a lower bound, which is typically that entity's FS threshold under normal load or its initial FS threshold, and an upper bound which represents the maximum amount of SCP capacity that could be used by an entity provided that other monitored entities are using less than their assigned FS threshold. The lower bound for the entity is determined during the engineering process when the SCP engineered circuitry is allocated to various entities within the SCP based on the projected demand for each entity. An analysis is completed at the conclusion of each observation interval in order to determine whether the FS threshold for a given entity should be increased over its initial FS threshold or normal load. In order to increase an entity's FS threshold over its normal value, other entities being serviced by the SCP must have used less than their FS threshold in the previous observation interval. In other words, an entity is allowed to increase its FS threshold only if there is some available processing capacity in the SCP not being used by other entities.

As shown in FIG. 5, each monitored entity has a corresponding counter 45 to determine if it has exceeded its FS threshold, and if so, by how much. The counters 45 for each corresponding monitored entity shown in FIG. 5 are incremented whenever a query is received with respect to that entity and decremented at fixed intervals, preferably at the conclusion of each observation interval, by an amount equal to the lesser of the interval of time actually used by the entity in the immediately preceding observation interval and the entity's FS threshold measured in terms of the number of queries received during the particular observation interval. Therefore, if the FS threshold is initially set in terms other than queries per observation interval, a basic mathematical conversion must be performed before decrementing the counter. The FS threshold is increased for an entity at the end of an observation interval only if that entity is experiencing high traffic volume and other entities are not utilizing all of their FS threshold capacity, thus resulting in under utilization of the total SCP real-time query processing capacity.

As discussed above, the FS thresholds are examined and, if necessary, changed at the conclusion of each observation interval. The preferred observation interval is 100 ms; however, there are several factors to be considered in selecting the interval. The interval should be small enough to provide a good estimate of the query rate over a short interval of time as well as the rate of change in that rate. However, the interval must be large enough to allow for at least one query arrival during the observation interval. It is possible to have different observation interval lengths for different monitored entities in the same SCP.

The FS threshold is associated with the counter corresponding to each monitored entity. At the end of each observation interval, the counter is decremented by the lesser of the interval of time actually used by the entity in the immediately preceding observation internal and the FS threshold for the entity. Almost immediately after the counter is decremented, the FS threshold will be updated to be used as the counter decrementation rate at the end of the next observation interval. It is assumed that an entity has exceeded its FS threshold if the counter 45 has a residual or positive value after it is decremented at the end of the observation interval. The cumulative residual at the end of the control interval, an interval longer than the observation interval, will be used to determine control parameters in the FSE process discussed below.

The second prong of the dynamic resource allocation process is the FSE, or fair share enforcing, process. The FSE 51 process is used to control query flow to a monitored entity which has exceeded its FS threshold over the previous control interval. The FSE process consists of two main activities: (a) determining whether an entity needs to be controlled, and, if so, (b) mapping the control data to actual control parameters, both severity and duration, at the SCP 26. The determination as to whether an entity needs its query flow to be controlled is made at the end of the control interval by the residual value stored in the counter for each entity. If the entity has violated its FS threshold substantially during the control interval, the counter value will be positive at the end of the control interval. This value, along with the total number of queries received for the entity during the control interval, will be used to determine an appropriate control parameter for the entity. As discussed above, the control parameter is referred to as the Selective Overload Code Control (SOCC). The SOCC is activated by the SCP by forwarding six and/or ten digit messages to SSPs 15 and 15' to selectively control the flow of queries to monitored entities who have exceeded their FS threshold over the previous control interval.

As with the observation interval, there are certain parameters which are preferably taken into account when establishing the length of the control interval. The control interval should be chosen such that there is enough time to determine whether the entity's overload is a steady state overload and not a transient one; however, the control interval should not be so long as to cause it to lag behind the overload event by a substantial interval of time.

FIGS. 6A–C illustrate why measuring the cumulative residual in the counter over a longer interval of time, i.e., the control interval, is preferable. FIG. 6A indicates a counter value measured over time with a cumulative residual which almost continually increases over the control interval. The residual value at the end of the control interval, which is a positive value for FIG. 6A, will be used in calculating the control parameters, or the SOCC, for the corresponding entity during the next control interval. FIGS. 6B and 6C, although representing different query patterns, do not have a positive cumulative residual value at the end of the control interval. Therefore, there will be no need to activate a code control for the corresponding entities with respect to FIGS. 6B and 6C, despite the fact that at several times during the control interval, the residual value is positive. In fact, FIGS. 6B and 6C illustrate one of the advantages of the present invention. The lack of a cumulative residual in the counters graphically shown in FIGS. 6B and 6C illustrate entities with transient, as opposed to steady state, overloads. Therefore, the process of the present invention can be applied to possibly raise the FS threshold of these entities during their peak times in the control interval and thereafter return those entities to their normal load FS threshold.

If it is determined that query flow to a monitored entity needs to be controlled, such as for the entity corresponding to the counter as shown in FIG. 6A, the appropriate SOCC parameters must be established. The determination of whether a monitored entity needs to be controlled is initially calculated by substituting the FS threshold for an entity from the number of queries received by the entity during the previous control interval. If an SOCC is needed, the control mapping function maps the query arrival statistics during the control interval to determine appropriate SOCC parameters, both gap level and control duration. Therefore, it is possible to alter the amount of queries which can be attributed to an entity for any given interval of time. An SOCC is preferably applied as a selective code control on 3, 6, 7, 8, 9, or 10 digits, typically corresponding to various digits in a telephone number. The SOCC is transmitted to SSPs using an Automatic Code Gap (ACG) message. The SSPs in turn will limit query flow for the appropriate monitored entity according to the SOCC contained in the ACG. The number of digits in the ACG message indicate the number of digits in the NPA-NXX-XXXX on which the control will be active. For example, assume that a six digit ACG message of SOCC type is received by the SSP on the code 404-261-XXXX. The SSP will activate a code control on all codes 404-261-XXXX regardless of what XXXX is. Each SSP controls the affected code independently and on a response basis. Therefore, the SSP does not activate any control on a code unless it receives an ACG message from the SCP 26.

In establishing the parameters for an SOCC, the approximate number of traffic sources which can originate a query stream to an entity must be known because each traffic stream to a specific code at a specific SSP represents an independently controlled traffic source. Therefore, the number of traffic sources involved in a particular code control scheme is a function of the number of SSPs which query the SCP 26 as well as the number of specific codes for which an ACG message can be initiated. To estimate the number of SSPs that initiate queries to a given SCP, it must be determined what type of trigger is used. If a trigger is used, every SSP in the LATA may send traffic to the SCP. If a terminating trigger (TT) is used, only one SSP sends queries to the SCP. Because it is sometimes difficult to estimate the number of active traffic sources which generate queries to an entity within the SCP, it is alternatively possible to have the SCP record in real-time the number of active sources by keeping track of the number of SSPs and the number of codes from which queries are sent.

In order to set an appropriate SOCC, it is necessary to determine what particular gap size (in time) at the SSP is needed to achieve the desired query arrival intensity at the SCP. Initially, it is assumed that there are N separate traffic sources (SSPs) which each generate query traffic at an intensity $\lambda i$ for the traffic source i. Therefore, the total query traffic at an SCP ($\lambda$) is equal to:

$$\sum_{i=1}^{N} \lambda i(G)$$

After a gap size, G, is chosen (in queries per unit time), it is possible to determine the traffic intensity at the SCP, $\lambda_{SCP}$, while the gap is determined using the following equation:

$$\lambda_{SCP} = \left( \frac{1}{1/\lambda + G/N} \right)$$

The FS threshold for a monitored entity can be characterized by the arrival intensity $\lambda_{FS}$ expressed in terms of the number of queries in a given time interval. To achieve the required arrival intensity, $\lambda_{FS}$, at an SCP, a gap size, G*, at the SSP is needed. Essentially, from the equation above, $\lambda_{FS}$ is substituted for $\lambda_{SCP}$ and G* is substituted for G. Thereafter, G* is determined as follows:

$$G^* = N \left( \frac{1}{\lambda_{FS}} - \frac{1}{\lambda} \right)$$

This equation indicates that the gap size required to achieve a traffic intensity equal to the FS threshold for an entity is proportional to the number of traffic sources. Furthermore, it is seen that the time required for the SOCC to take effect depends on the number of traffic sources.

From the foregoing description of the preferred embodiment, other embodiments of the present invention will suggest themselves to those skilled in the art and therefore the scope of the present invention is to be limited only by the claims below and equivalents thereof.

I claim:

1. A process for use in allocating resource time in a service control point (SCP) located in an Advanced Intelligent Network used in operation of a telephone network amongst a plurality of monitored entities, comprising the steps of:

initially assigning a SCP resource time to each of said plurality of monitored entities;

monitoring the respective use of said SCP resource time by each of said plurality of monitored entities already chosen observation interval;

measuring any unutilized SCP resource time by any of said plurality of monitored entities during a previous observation interval; and re-assigning said unutilized SCP resource time to those of said plurality of monitored entities using more than there respective assigned SCP resource time during said chosen observation interval.

2. A process for use in allocating resource time in a service control point (SCP) located in an Advanced Intelligent Network used in operation of a telephone network amongst a plurality of monitored entities, comprising the steps of:

initially assigning a SCP resource time to each of said plurality of monitored entities;

monitoring the respective use of said SCP resource time by each of said plurality of monitored entities over a chosen observation interval;

measuring any unutilized SCP resource time by any of said plurality of monitored entities during a previous observation interval; and assigning said unutilized SCP resource time to those of said plurality of monitored entities using more than their respective assigned SCP resource time during said chosen observation interval;

monitoring the total use of said SCP resource time by said plurality of monitored entities during said chosen observation interval;

determining whether said SCP is operating at full capacity during said chosen observation interval; and limiting the use of said SCP resource time by any one of said plurality of monitored entities using said SCP resource time in said chosen observation interval greater than that initially assigned to said one of said plurality of monitored entities if said SCP is operating at said capacity.

3. The process of claim 1, wherein said step of monitoring said respective use of said SCP resource time by each of said plurality of monitored entities comprises monitoring said use of a counter which is updated on a periodic basis.

4. A process for use in allocating resource time to process various queries in a service control point (SCP) located in an Advanced Intelligent Network used in operation of a telephone network amongst a plurality of monitored entities, comprising the steps of:

initially assigning a SCP resource time for processing of said queries to each of said plurality of monitored entities;

monitoring said SCP for said queries by using a plurality of counters, each of said plurality of monitored entities being associated with at least one of said plurality of counters;

determining the monitored entity of said plurality of monitored entities which is receiving a query for processing;

incrementing the counter from said plurality of counters which is associated with said monitored entity receiving said query for processing;

assigning an interval of time as an observation interval;

decrementing said counter after said observation interval by an amount equal to the lesser of the interval of time actually used by said monitored entity in an immediately previous observation interval and said SCP resource time;

determining which of said plurality of counters have zero values at the end of said observation interval;

determining which of said plurality of counters have positive values at the end of said observation interval; and re-assigning unutilized time from said plurality of monitored entities with said zero value counters to said plurality of monitored entities with said positive value counters at the end of said observation interval.

5. The process of claim 4, further comprising the step of:

regulating the flow of said queries to said plurality of monitored entities with positive counter values over a control interval, said control interval being longer than said observation interval.

6. The process of claim 4, further comprising the step of:

regulating the flow of said queries to said plurality of monitored entities based upon the flow of queries to said monitored entities at various points in time during said observation interval.

7. The process of claim 4, further comprising the step of:

initiating control parameters to reduce the flow of said queries to at least one of said plurality of monitored entities, said control parameters being based on the cumulative values of said plurality of counters for said plurality of monitored entities at the end of a control interval.

8. The process of claim 4, further comprising the steps of:

determining if said SCP is operating at its engineered capacity; and initiating control parameters to reduce the flow of said queries to each of said plurality of monitored entities if said SCP is operating at said engineered capacity.

9. The process of claim 4, further comprising the steps of:

determining if said SCP is operating at its engineered capacity; and initiating control parameters to reduce the flow of said queries to each of said monitored entities which exceeded said SCP resource time in said immediately previous observation interval if said SCP is operating at said engineered capacity.

10. A process for use in allocating resource time to process various queries in a service control point (SCP) located in an Advanced Intelligent Network used in operation of a telephone network amongst a plurality of monitored entities, comprising the steps of:

initially assigning a SCP resource time for processing of said queries to each of said plurality of monitored entities;

monitoring said SCP for said queries by using a plurality of counters, each of said plurality of monitored entities being associated with at least one of said plurality of counters;

determining the monitored entity of said plurality of monitored entities which is receiving a query for processing;

incrementing the counter from said plurality of counters which is associated with said monitored entity receiving said query for processing;

assigning an interval of time as an observation interval;

decrementing said counter after said observation interval by an amount equal to the lesser of:

the number of said queries received during an immediately previous observation interval or said SCP resource time;

determining which of said plurality of counters have zero values at the end of said observation interval;

determining which of said plurality of counters have positive values at the end of said observation interval; and re-assigning unutilized time from said plurality of monitored entities with said zero value counters to said plurality of monitored entities with said positive value counters at the end of said observation interval.

11. The process of claim 10, further comprising the step of:

regulating the flow of said queries to said plurality of monitored entities with positive counter values over a control interval, said control interval being longer than said observation interval.

12. The process of claim 10, further comprising the step of:

regulating the flow of said queries to said plurality of monitored entities based upon the flow of queries to said monitored entities at various points in time during said observation interval.

13. The process of claim 10, further comprising the step of:

initiating control parameters to reduce the flow of said queries to at least one of said plurality of monitored entities, said control parameters being based on the cumulative values of said plurality of counters for said plurality of monitored entities at the end of a control interval.

14. The process of claim 10 further comprising the steps of:

determining if said SCP is operating at its engineered capacity; and initiating control parameters to reduce the flow of said queries to each of said plurality of monitored entities if said SCP is operating at said engineered capacity.

15. The process of claim 10, further comprising the steps of:

determining if said SCP is operating at its engineered capacity; and initiating control parameters to reduce the flow of said queries to each of said monitored entities which exceeded said SCP resource time in said immediately previous observation interval if said SCP is operating at said engineered capacity.

\* \* \* \* \*